United States Patent
Shelton et al.

(10) Patent No.: US 8,032,566 B2
(45) Date of Patent: Oct. 4, 2011

(54) TOOLS FOR DEFINING AND USING CUSTOM ANALYSIS MODULES

(75) Inventors: Scott Shelton, Apex, NC (US); David Carmer, Cary, NC (US); Henry Fu, Chapel Hill, NC (US); Jason Figge, Pittsboro, NC (US); Leslie Mannion, Wake Forest, NC (US); Michael Chaves, Cary, NC (US); Claud Teeter, Fuquay Varina, NC (US); Robert Baril, Apex, NC (US)

(73) Assignee: Teradata US, Inc., Dayton, OH (US)

( * ) Notice: Subject to any disclaimer, the term of this patent is extended or adjusted under 35 U.S.C. 154(b) by 198 days.

(21) Appl. No.: 11/566,409

(22) Filed: Dec. 4, 2006

(65) Prior Publication Data

US 2008/0134029 A1    Jun. 5, 2008

(51) Int. Cl.
  *G06F 17/30* (2006.01)
(52) U.S. Cl. ..................................... 707/807; 715/225
(58) Field of Classification Search .............. 707/3, 100, 707/102, 104.1, 802–805, 807, 999.003, 707/999.1, 999.102, 4; 345/520, 522, 530; 705/1, 10, 700, 730, 734, 739, 744, 746, 705/762, 780, 962, 968, 1.1; 715/730, 734, 715/735, 739, 744, 746, 762, 780, 962, 968, 715/243, 273, 700, 225, 226
See application file for complete search history.

(56) References Cited

U.S. PATENT DOCUMENTS

| | | | |
|---|---|---|---|
| 5,701,453 A * | 12/1997 | Maloney et al. | 707/2 |
| 6,016,394 A * | 1/2000 | Walker | 717/104 |
| 6,581,068 B1 | 6/2003 | Bensoussan et al. | |
| 6,687,693 B2 | 2/2004 | Cereghini et al. | |
| 6,915,308 B1 | 7/2005 | Evans et al. | |
| 6,983,257 B2 | 1/2006 | Gatto | |
| 7,010,495 B1 | 3/2006 | Samra et al. | |
| 7,275,216 B2 * | 9/2007 | Paoli et al. | 715/763 |
| 7,319,996 B2 | 1/2008 | Chen et al. | |
| 7,386,571 B2 | 6/2008 | Gupta | |
| 7,606,831 B2 * | 10/2009 | Quinn et al. | 707/104.1 |
| 2003/0187874 A1 | 10/2003 | Peschel et al. | |
| 2006/0224990 A1 * | 10/2006 | Treibach-Heck et al. | 715/780 |
| 2006/0282432 A1 | 12/2006 | Cassidy et al. | |
| 2007/0011134 A1 * | 1/2007 | Langseth et al. | 707/1 |
| 2007/0174290 A1 * | 7/2007 | Narang et al. | 707/10 |
| 2010/0262901 A1 * | 10/2010 | DiSalvo | 715/227 |

* cited by examiner

*Primary Examiner* — Greta Robinson
(74) *Attorney, Agent, or Firm* — Schwegman, Lundberg & Woessner, P.A.

(57) ABSTRACT

Tools for defining and using custom analysis modules are presented. A generic graphical user interface (GUI) custom analysis tool is presented to a user. The generic GUI custom analysis tool is adapted to receive selections and inputs from the user that define many-to-many relationships in a data store and that include user-defined measures. The inputs are used to generate an instance of a custom analysis module that is capable of being processed against the data store. The instance of the custom analysis module may be stored, recalled, executed, and/or modified from the generic GUI custom analysis tool.

6 Claims, 9 Drawing Sheets

TOOLS FOR DEFINING AND USING CUSTOM ANALYSIS MODULES

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example screen shots and images as described below and in any drawings hereto: Copyright© 2006, NCR Corp. of Dayton, Ohio—All Rights Reserved.

FIELD

The invention relates generally to data store processing and more particularly to techniques for data mining by defining and using custom analysis modules.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals.

Typically, these queries or mining applications are limited to pre-defined customer segments represented as hierarchical relationships within the database. But, data mining constrained to pre-defined hierarchical relationships can only produce relevant information within the context of these pre-defined relationships. In other words, newly discovered relationships of importance must be manually represented within the pre-existing relationships before the information related to the new relationships can be explored within the database.

Also, the queries or mining applications often rely on pre-existing measures; many of which come pre-packaged as features of a particular database's Application Programming Interface (API). Yet, frequently an analyst may have a unique situation that necessitates aggregated measures or even new measures. In these cases, the analyst typically requests that a developer custom produce the needed measures. This results in lost time and increases an enterprise's expense. Furthermore, if the time lag is substantial the desired measure may become worthless or meaningless as events in the marketplace transpire or time-sensitive opportunities are lost.

Finally, the queries and mining applications are often executed or produced using different tools and interfaces. Thus, an analyst has to use or become fluent in multiple tools or interfaces to effectively achieve a desired query or mining application.

Moreover, some tasks that the analyst may need to do to produce a desired query or mining application may result in using multiple different aspects of a same tool or interface. In other words, the needed features are not integrated in a seamless manner within the same tool or interface that the analyst uses.

Thus, it can be seen that improved mechanisms, tools, and/or interfaces for producing and using applications associated with database analysis are desirable.

SUMMARY

In various embodiments, tools for defining and using custom analysis modules are presented. According to an embodiment, a method for operating a custom analysis tool is presented. A generic graphical user interface (GUI) analysis tool is presented. Fields are provided within the generic GUI analysis tool to receive one or more schema and segment relationships, an analysis type, a profile name, and one or more user-defined measures. Moreover, selections or inputs are received for each of the fields and the selections or inputs are communicated to a driver service that builds an instance of a customized analysis module. The instance of the customized analysis module can be processed against a data store, when a particular one of inputs that identifies the profile name is referenced.

BRIEF DESCRIPTION OF THE DRAWINGS

FIG. 5 is an example screen shot of a custom analysis tool for defining a cross segment analysis and for presenting results, according to an example embodiment.

FIG. 7 is an example screen shot of a custom analysis tool for defining a percentile profiling and for presenting results, according to an example embodiment.

DETAILED DESCRIPTION

Figure 1:
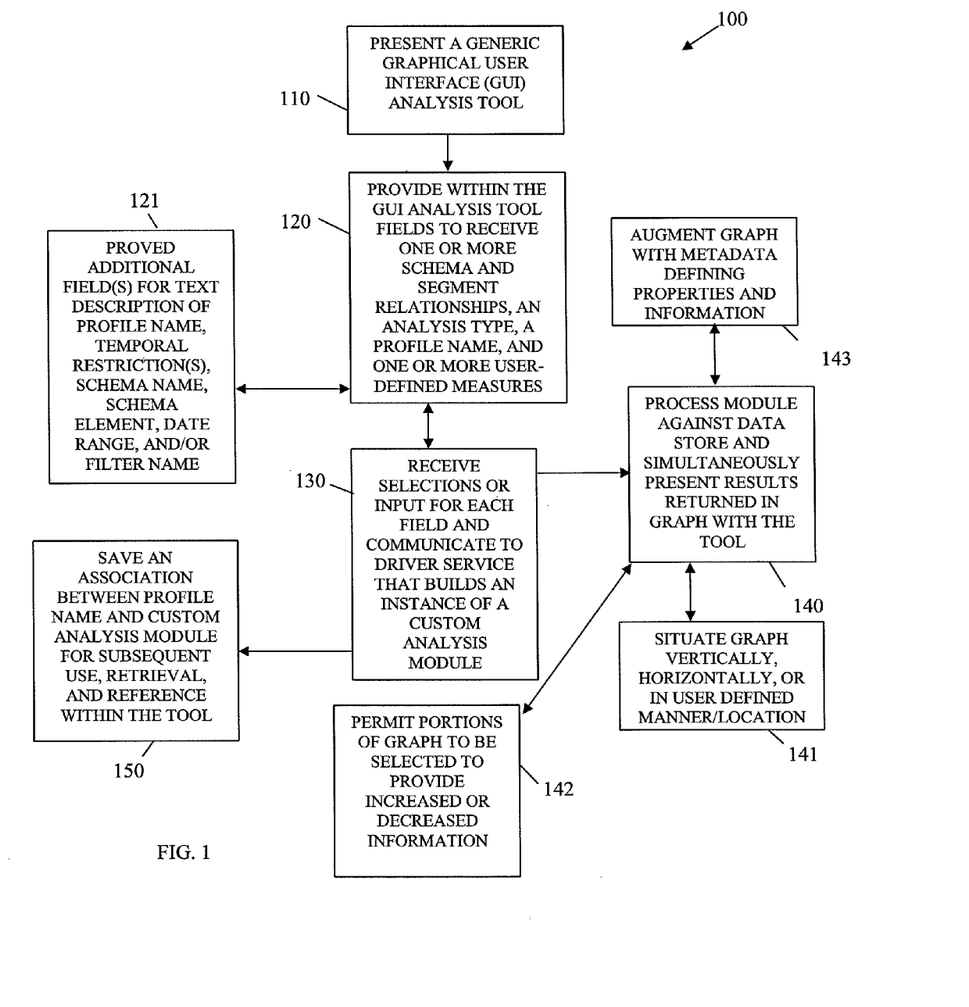
FIG. 1 is a diagram of a method for managing operating a custom analysis tool, according to an example embodiment.

FIG. 1 is a diagram of a method 100 for managing operating a custom analysis tool, according to an example embodiment. The method 100 (hereinafter "custom analysis interface service") is implemented in a machine-accessible or computer-readable medium as instructions that when executed by a machine (processing device) performs the processing depicted in FIG. 1. Moreover, the custom analysis interface service is optionally accessible over a network. The network may be wired, wireless, or a combination of wired and wireless.

A "data store" as used herein may include a database, a collection of databases organized as a data warehouse, a directory, a collection of directories cooperating with one another, or various combinations of the same. According to an embodiment, the data store is a Teradata® warehouse product or service distributed by NCR Corporation of Dayton, Ohio.

The data store includes a variety of enterprise information. One type of information is referred to as an "entity." An entity is something that can be uniquely identified (e.g., a customer account, a customer name, a household name, a logical grouping of certain types of customers, etc.).

A table within the data store may include a schema that defines the relationship between one or more elements in the data store. For example, the relationship between data store element "household" to element "individual" and to element "account" (household->individual->account). The schema defines the fields or elements of the data store. The data store includes a plurality of different tables and different schema's. Schema relationships may be hierarchical or many-to-many relationships.

"Segmentation" refers to relationships that are defined for a particular population that may be the target of a communication sent from an enterprise. For example, a segment may define all males over the age of 18 in the Raleigh, N.C. area. Segments can be predefined within the data store or can be dynamically defined and acquired via queries against the data store. "Cross Segment" refers to analyzing measures at the intersections of multiple different segments.

An "analysis module" refers to a data store application that is designed to perform one or more queries and/or other operations on data acquired from the data store. The analysis module may be directed to achieve some form of desired analysis by an enterprise. Some example analysis types include, but are not limited to, behavior trend analysis, cross segmentation analysis, pattern detection, percentile profiling, product or service affinity analysis, and the like.

A "measure" is a calculation or set of calculations performed against data returned from the data store. "Measures," as used herein, may be pre-existing within an API of the data store or may be user-defined. An example measure may be to take the average purchase amount from a given set of data associated with customers. Measures can be simple or complex and involve multiple operations some of which rely on prior processed operations. One or more measures are referenced or used within any given analysis module.

It is within this context that the processing associated with the custom analysis interface service is now described in detail with reference to the FIG. 1.

At 110, the custom analysis interface service is used to present a generic GUI analysis tool to a user. The custom analysis interface service may present the generic GUI analysis tool from within another service or system, such as, but not limited to, the Teradata® products and services, distributed by NCR Corporation of Dayton, Ohio.

In an embodiment, a user selects an option within a service to process the generic GUI analysis tool. This prompts the custom analysis interface service to present the generic GUI analysis tool to the user within a display being viewed by the user.

In another case, the custom analysis interface service is selected or initiated by the user or by another service that is being directed by the user. This results in the custom analysis interface service presenting the generic GUI analysis tool to the user.

At 120, the custom analysis interface service provides the generic GUI analysis tool with a variety of fields. Some fields include selections that the user may make from an available list of selections. Other fields permit the user to browse directories or data sources for files or information. Still other fields permit the user to manually type information into them. Each field is designed to receive information from the user. Some fields may be mandatory, while other fields may be optional. Policy or configuration may drive what fields are considered mandatory and what fields are considered to be optional.

At least some fields are designed to receive selections or inputs representing one or more schema and segment relationships, an analysis type, a profile name, and one or more user-defined measures. The schema and segment relationships define element to element or many-to-many relationships. That is, any entity or element defined within a schema or segment of a data store can have a relationship with another entity or element of a different schema, same schema, different segment, or same segment. At least one field is designed to receive at least one such relationship. The relationship may be defined via options associated with the generic GUI analysis tool in a dynamic and user-defined manner. Alternatively existing relationships may be selected from lists. The lists may be dynamically populated based on other selections and inputs supplied by the user, such as selections or inputs for the analysis type.

The analysis type can define a variety of types of analysis, such as but not limited to behavior trend analysis, cross segment analysis, pattern detection, percentile profiling, or product affinity analysis. Each of these is discussed herein and below in greater detail with reference to the example screen shots presented in FIGS. 4-8. Moreover, it is noted that other analysis types may be used as well. The selection or input of an analysis type within the generic GUI analysis tool may also dynamically drive changes in the fields for the tool to reflect what is needed for the particular analysis type desired. It may also be the case, that a user accessed different screens of the generic GUI analysis tool by selecting an initial analysis type, such that when a screen is presented to the user it includes the desired analysis type and the appropriate fields associated with that analysis type.

The profile name is a user selected or inputted value that is used as an identifier for the custom analysis module being developed. In some cases, the user may browse a data store or list; or even may search a data store or list for a pre-existing profile name. When this occurs the pre-existing profile name and selections and inputs associated with it are automatically populated into the fields of the generic GUI analysis tool. The profile name may be viewed as a label or identifier for the custom analysis module being interactively and dynamically developed.

The user-defined measures represent single or aggregate calculations or operations defined by a user or previously defined by a user and acquired via searching, browsing, etc. from a list or data store. The operations or calculations may be chained together in aggregate or script-like format within a single measure. Some example calculations may include, but in no way are limited to, averages, highs, lows, etc. for a given data corpus or value(s) within a data corpus.

According to an embodiment, at 121, the generic GUI analysis tool may also provide a variety of additional fields, such as fields for text descriptions that provide information about what the profile name or custom analysis modules does. There may also be fields for a variety of temporal restrictions (e.g., date, time of day, day of week, month, year, etc.). Additionally, a specific schema or element may be provided as one or more fields within the generic GUI analysis tool or a filter script name may be supplied to process. In still another case, a field may represent a date range. Examples of these and other fields are provided below with reference to the FIGS. 4-8.

At 130, the custom analysis interface service dynamically receives selections or inputs for each field or for each field that is mandatory for a given analysis type and any desired optional fields being used. These are supplied by a user interacting with the generic GUI analysis tool. These selections and inputs are then supplied to a driver service or processing engine. The driver service builds an instance of a custom analysis module that is defined or derived at least in part from the selections and inputs supplied by the user to the generic GUI analysis tool.

At this point, the user may save the instance of the custom analysis module via the generic GUI analysis tool by associating it with a particular input supplied with the profile name field. The profile name may now be used and referenced to acquire and process the instance of the custom analysis module produced by the driver service or the processing engine. It is noted that the association may be temporarily noted and saved in memory even before any explicit save occurs with the profile name. Moreover, the processing engine may save the association automatically or the user may have to explicitly request the save. In cases, where the association is not automatically saved the user may be warned before existing a session if the user has not elected to perform the save.

According to an embodiment, at 140, the user may use the generic GUI analysis tool to instruct it to process the custom analysis module against a data store (which may also be defined already in the custom analysis module). The generic GUI analysis tool processes or causes to process the custom analysis module against the data store and then displays the results returned as an interactive graphic presentation to the user within the tool. The interactive graphic illustration may be interacted with in a number of real-time and dynamic manners by the user. The illustration may be a grid, a table, a chart, or any combination of these things that permit the results to be visually depicted and interacted with. Examples of this can be visualized with the FIGS. 4-9; discussed herein and below.

In some cases, at 141, the position of the interactive graphic illustration relative to the initial presented generic GUI analysis tool may be above or below (vertical) the tool, to the right or left (horizontal) to the tool, or may be even user defined relative to a location of the tool. This permits the user to simultaneously visualize the results with the selections and inputs associated with the custom analysis tool displayed in the tool. Essentially, the user may be given control to display and view different parts of the results in different manners and can simultaneously see the corresponding input selections.

In an embodiment, at 142, the custom analysis interface service permits portions of the interactive graphic illustration that is presented to be interactively and dynamically selected by the user. Once selected the details or information associated with the results that underlie the interactive graphic illustration at the selected portions or locations are increased or decreased depending upon instruction from the user. So, the user may drill down into more detailed information or pan out to more generic and high level information for any selected portion of the interactive graphic illustration. Again, the interactive graphic illustration reflects the results from executing the custom analysis module against the data store.

In some situations, at 143, the custom analysis interface service may also augment the interactive graphic illustration with metadata or additional text that is displayed within the interactive graphic illustration or in proximity to the interactive graphic illustration. This metadata may define the properties of the interactive graphic illustration and other information associated with the interactive graphic illustration as a whole or associated with just portions of the interactive graphic illustration. Some of the properties may be edited by the user to present the results different detail or to present the results in different manners or locations.

According to another embodiment, at 150, the custom analysis interface service may (as was stated above briefly) save an association between the profile name selection or input value with the generated instance of the custom analysis module produced by the processing engine. This permits subsequent use, retrieval, and reference of the custom analysis module within the generic GUI analysis tool. Again, it may be that the profile name and analysis module association is at least initially saved in memory before the analysis module is processed to produce results. The association may or may not be retained after a session with the user ends; this depends on whether the user elects to save the association. Again, the user may be warned before the association is lost when exiting a session, if the association was not saved.

It is now appreciated how the custom analysis interface service permits dynamic interaction with a user via a generic GUI analysis tool to receive selections and inputs that are used to dynamically generate custom analysis modules. These modules may be dynamically executed and results viewed in concert with the tool and the results themselves may be manipulated to expand or decrease information associated with the results. The views and location of the interactive graphic illustration may also be user-altered as well.

Figure 2:
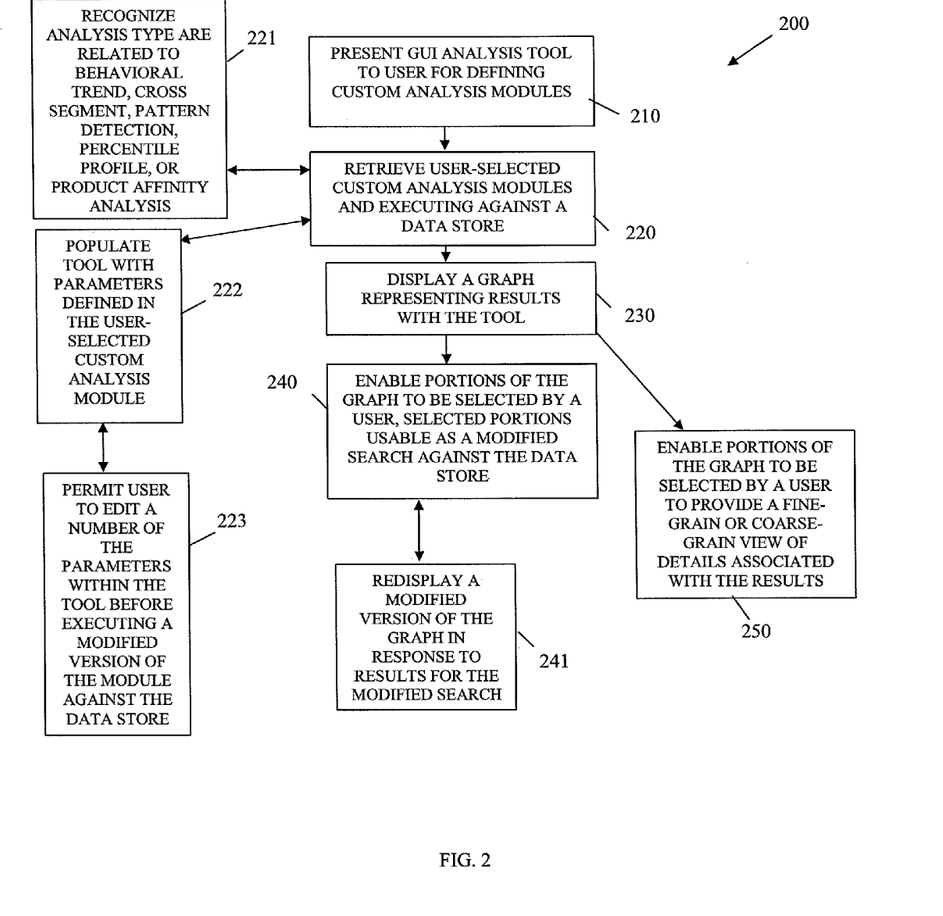
FIG. 2 is a diagram of another method for operating a custom analysis tool, according to an example embodiment.

FIG. 2 is a diagram of another method 200 for operating a custom analysis tool, according to an example embodiment. The method 200 (hereinafter "custom analysis presentation service") is implemented in a machine-accessible and readable medium as instructions that when executed by a machine performs the processing reflected in FIG. 2. The custom analysis presentation service may also be accessible over a network. The network may be wired, wireless, or a combination of wired and wireless. The custom analysis presentation service presents an alternative and in some cases an enhanced processing perspective to the custom analysis interface service represented by the method 100 of the FIG. 1.

At 210, the custom analysis presentation service presents a GUI analysis tool to a user from defining custom analysis modules. The manners in which the tool may be initially initiated and presented via the custom analysis presentation service is similar to what was presented above with respect to the method 100 of the FIG. 1.

At 220, the custom analysis presentation service retrieves user-selected custom analysis modules at the direction of the user and executes them against a data store. The data store may be defined in the custom analysis module or may be supplied via a prompt if the custom analysis module so directs when executed.

At 221, and as was discussed above with the method 100 of the FIG. 1, the custom analysis modules may be associated with specific custom analysis types, such as but not limited to behavior trend, cross segment analysis, pattern detection, percentile profiling, product affinity analysis, etc.

According to an embodiment, at 222, the custom analysis presentation service, in response to a selected or input profile name that is associated with a desired custom analysis module, may automatically populate the GUI analysis tool with parameter values defined or associated with the selected or inputted custom analysis module. That is, the user may call up a specific and previously built custom analysis module to be populated into the tool by referencing its identifier or label embodied as the profile name for the custom analysis module.

At 223, the custom analysis presentation service may then permit the user to edit, modify, or change a number of the parameter values within fields of the tool before the resulting modified version of the custom analysis module is generated and executed against the data store. In this way, the user can modify previously developed custom analysis modules.

At 230, the custom analysis presentation service displays an interactive graphic illustration representing results with or in connection with the GUI analysis tool. In some cases, at 240, the custom analysis presentation service may permit portions of the interactive graphic illustration to be user selected. The selected portions may be targeted for saving as a segment, which can be used in subsequent communications, other applications, or even other analysis modules. So, the user may select a portion of the interactive graphic illustration and metadata associated with the selected portion may be displayed in a pop up or existing window. The user can edit the information, if desired, to create a custom segment and then perhaps direct the existing information to be associated with a different custom analysis module and use that as a modified search to perform user-defined analysis on a subset of the results, or even use it in targeted marking communications. At 241, a modified version of the interactive graphic illustration may be dynamically redisplayed in response to new results returned from the modified search, analysis, etc.

In another embodiment, at 250, the custom analysis presentation service may enable portions of the interactive graphic illustration to be user selected to provide options that present the user with fine grained information or more coarse grain information associated with underlying details for the results. In this way, results associated with executing a custom analysis module can be interacted with to achieve a user-defined degree of detail for user analysis.

Figure 3:
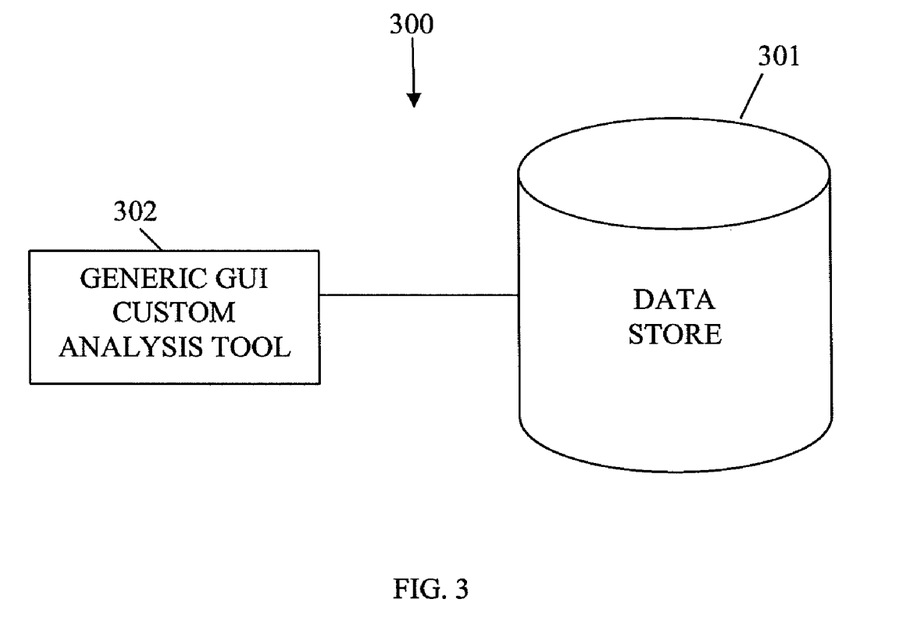
FIG. 3 is a diagram of a custom analysis system, according to an example embodiment.

FIG. 3 is a diagram of a custom analysis system 300, according to an example embodiment. The custom analysis system 300 is implemented in a machine-accessible and readable medium and is operational over a network. The network may be wired, wireless, or a combination of wired and wireless. In an embodiment, portions of the custom analysis system 300 implements, among other things the custom analysis interface service and custom analysis presentation service represented by the methods 100 and 200 of the FIGS. 1 and 2, respectively.

The custom analysis system 300 includes a data store 301 and a GUI custom analysis tool 302. Each of these and their interactions with one another will now be discussed in turn.

The data store 301 may be a directory, a database, a data warehouse, or a collection of these items. The data store 301 includes a variety of logically organized information and an interface that permits the information to be updated, deleted, created, and obtained (such as via a query language (SQL, etc.).

The data store 301 may include schemas for tables and may include existing tables or hierarchies representing previously defined custom segments. The data store 301 also includes custom data related to customer interactions, communications, and other information related to an enterprise. Any particular field or element of a table may be associated with another element of the same table or another element or group of elements associated with one or more different tables. This permits many-to-many relationships to be defined against the data included in the data store 301. These relationships may be predefined or may be dynamically user-defined using the generic GUI custom analysis tool 302.

The generic GUI custom analysis tool 302 includes a variety of fields to receive parameters from a user to define values for those fields. A collection of any set of parameters that a user selects or inputs defines a particular custom analysis module. Each custom analysis module is capable of using many-to-many user-selected relationships defined for schemas (schema elements) or even segments (segment elements) existing in the data store 301. Each custom analysis module may also incorporate one or more user-defined measures in at least one of the fields within the generic GUI custom analysis tool 302 as at least one of the user-supplied parameters.

Moreover, the generic GUI custom analysis tool 302 is adapted to process or cause to process the custom analysis modules against data store 301. When processed the data store 301 returns results that the generic GUI custom analysis tool 302 uses to dynamically expand a presentation to the user to display or depict an interactive graphic illustration of the results.

In some cases, the interactive graphic illustration is adapted to include selectable portions that when selected by a user provides a custom-level of detail for information associated with the selectable portions as defined in the interactive graphic illustration.

In more situations, the interactive graphic illustration may also be adapted with other options associated with the generic GUI custom analysis tool 302 to permit the user to generate and execute a modified search or even a modified or new custom analysis module against the data store 301 using at least some information associated with the interactive graphic illustration portion selected by the user.

According to an embodiment, the generic GUI custom analysis tool 302 may also be adapted to dynamically load fields or values for fields in response to a user selection of a particular pre-existing custom analysis module. So, a user may use the generic GUI custom analysis tool 302 to define an entirely new instance of a new custom analysis module or to define a modified instance of an existing custom analysis module.

The generic GUI custom analysis tool 302 is also adapted to forward the parameters supplied by the user in the fields of the generic GUI custom analysis tool 302 to a driver or an engine. The engine generates the custom analysis modules, which are derived at least in part based on the parameters.

The generic GUI custom analysis tool 302 presents a common interface for a variety of different and user-defined analysis types. A user no longer has to attempt to memorize different interfaces or even analysis types. When a user creates a new custom analysis module the user can use the generic GUI custom analysis tool 302 to toggle between analysis types to see the differences and descriptions associated with the different analysis types.

Figure 4:
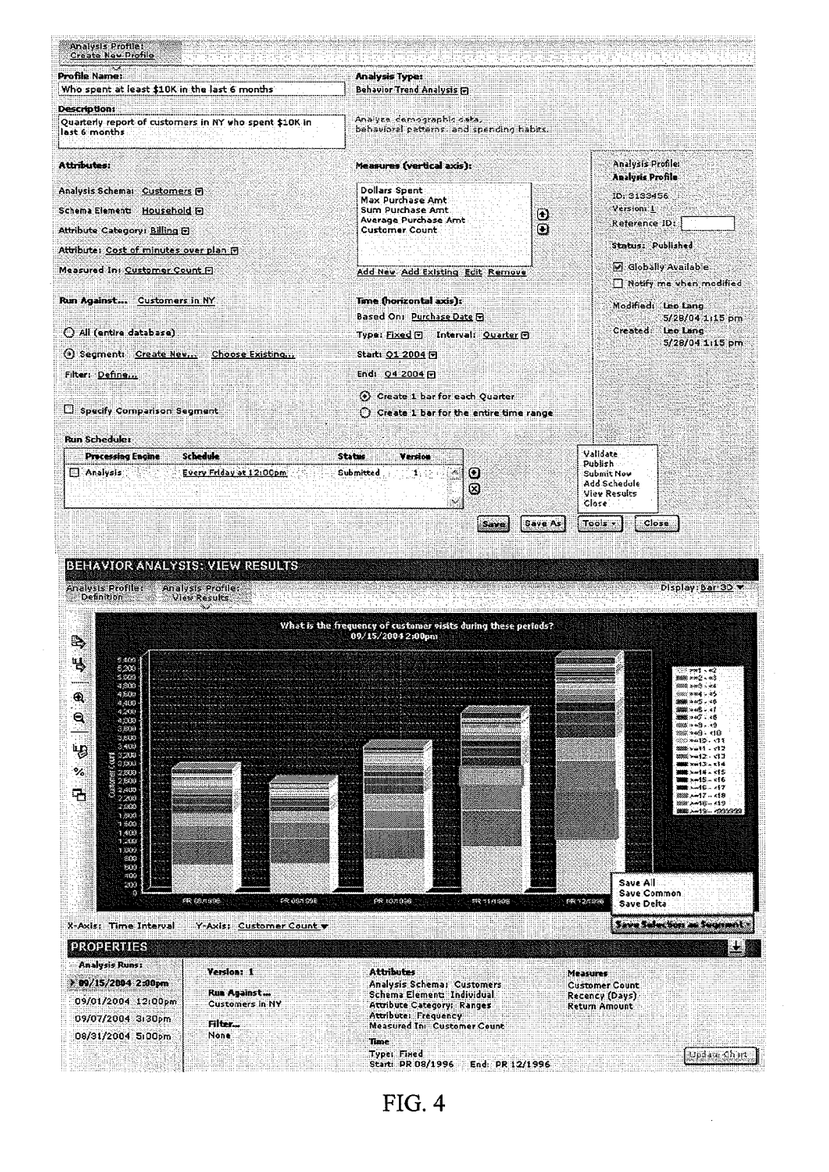
FIG. 4 is an example screen shot of a custom analysis tool for defining a behavior trend analysis and for presenting results, according to an example embodiment.

FIG. 4 is an example screen shot of a custom analysis tool for defining a behavior trend analysis and for presenting results, according to an example embodiment.

FIG. 4 presents a variety of information. The top most screen depicts an example populated instance of a GUI analysis tool for a specific set of example data. The analysis type is identified as behavior trend analysis. The associated profile name is labeled as "who spent at least $10K in the last 6 months." A description field provides more detailed information about this custom analysis module that is defined in this FIG. 4. Attribute fields permit various schemas, schema elements, and categories of information to be identified. A measure may also be defined here. Another field identifies the data store table to run against from the data store or a customer segment that is derived from the data store. Existing segments may be used or even dynamically end-user defined. Measures may be selected or even user-defined. Temporal or even scheduling limitations may be defined as well.

This custom analysis module being created may be used to answer a variety of questions, such as whose visit frequency increased during a fall promotion; what are the changes in net purchase amounts over each quarter for some defined time period; which vacations are preferred by ages 1-17, 18-35, 36-50, >50, etc.; and/or how does one segment behave differently from another segment. These are only examples as to how a behavior trend analysis type may be used. It is appreciated other questions may be answered via such an analysis type as is presented with the example FIG. 4.

FIG. 4 also shows a simultaneous interactive graphic illustration at the bottom of the FIG. 4 representing example results returned from the custom analysis module generated and defined in the top of the FIG. 4. Portions or elements of the interactive graphic illustration may be selected to acquire more fine grain or coarse grain detail. Metadata associated with properties of the interactive graphic illustration may also be displayed under the graphed results.

FIG. 5 is an example screen shot of a custom analysis tool for defining a cross segment analysis and for presenting results, according to an example embodiment.

Again a consistent GUI analysis tool is presented in FIG. 5 as was in FIG. 4 with minor variations reflecting that this particular view of the tool is associated with a cross segment analysis type for the custom analysis module being defined and used within the tool.

Some example questions that may be answered with this analysis type include, but are not limited to, calculate a propensity to buy; determine demographics for frequent shoppers or ATM users; migrate customers from non-valuable to valuable customers; identify key characteristics of intersections between segments; analyze relationships between segments and attributes, etc.

Again a variety of fields are presented and populated with user selected or supplied inputs and the dynamic interactive graphic illustration or results is shown below the inputs along with metadata associated with the results or interactive graphic illustration.

Figure 6:
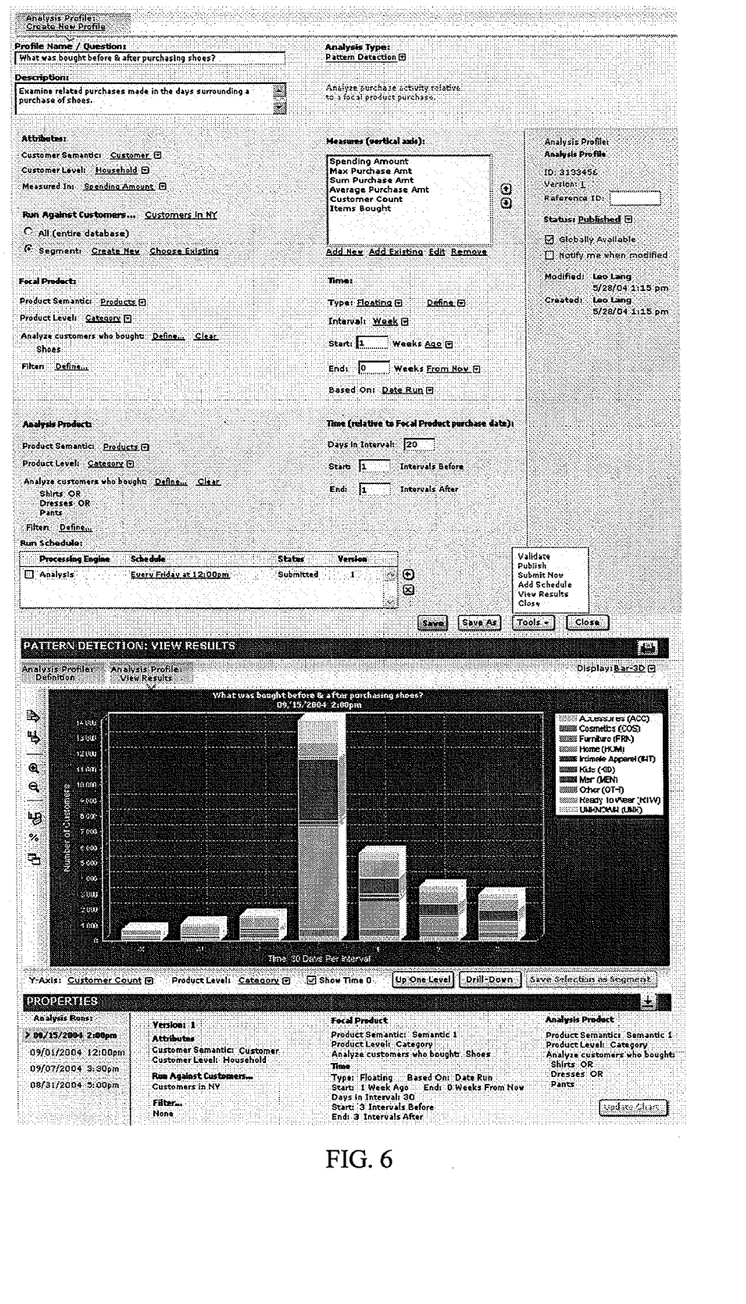
FIG. 6 is an example screen shot of a custom analysis tool for defining a pattern detection and for presenting results, according to an example embodiment.

FIG. 6 is an example screen shot of a custom analysis tool for defining a pattern detection and for presenting results, according to an example embodiment.

A similar presentation of the GUI analysis tool is presented with the FIG. 6 as was with FIGS. 4-5. Here, a pattern detection analysis type is being used, which may alter some types of fields being presented. The pattern detection analysis type may be used to answer a variety of questions, such as but not limited to which product purchases might be indicators of a future purchase of a different product; which services should we offer together to increase revenue; what are trends in purchasing activity leading up to and after a particular purchase; of people who bought insurance, how soon after did they make a claim; etc.

Again dynamic results and metadata associated with the results are presented in an interactive graphic illustration for user inspection and user interaction at the bottom of the FIG. 6.

FIG. 7 is an example screen shot of a custom analysis tool for defining a percentile profiling and for presenting results, according to an example embodiment.

FIG. 7 shows a percentile profiling analysis type. Again, fields may be slightly altered in response to the chosen analysis type. This type of analysis might be used to answer questions such as, but not limited to, who are the top 10% of our customers based on amount purchased; who are the bottom 10% of customers in terms of profitability; what are our most/least lucrative products or services; which cell phone customers should be targeted for up sell or rewards; what is the maximum return from credit card customers in each decile; etc. Again, dynamic results are presented in an interactive graphic illustration form along with metadata associated with the results and the interactive graphic illustration at the bottom of the FIG. 7.

Figure 8:
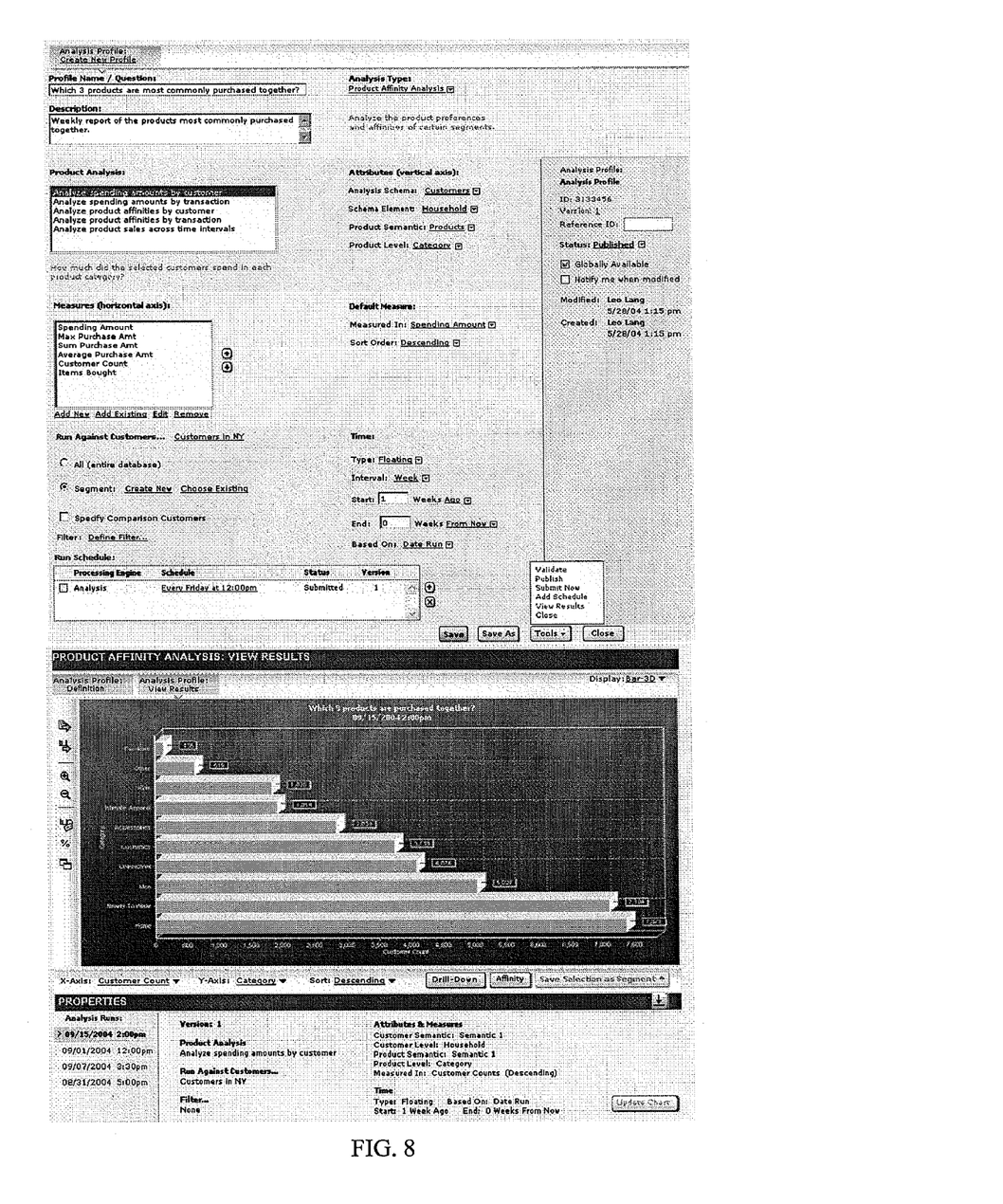
FIG. 8 is an example screen shot of a custom analysis tool for defining a product affinity analysis and for presenting results, according to an example embodiment.

FIG. 8 is an example screen shot of a custom analysis tool for defining a product affinity analysis and for presenting results, according to an example embodiment.

Here, a product affinity analysis type is presented and the tool presents fields associated in a same and consistent manner as was presented with the FIGS. 4-7. The custom analysis module produced and executed by the selections and inputs are used to dynamically process against a data store and an interactive graphic illustration reflecting the results are presented at the bottom of the FIG. 8. The product affinity analysis type might be used to answer a variety of questions, such as but not limited to which 3 products are most commonly purchased together; what combination of products is most often purchased by a segment; how much time generally elapses between purchases of 2 services; what future items will likely be purchased by a customer who buys a certain produce or service, etc.

Figure 9:
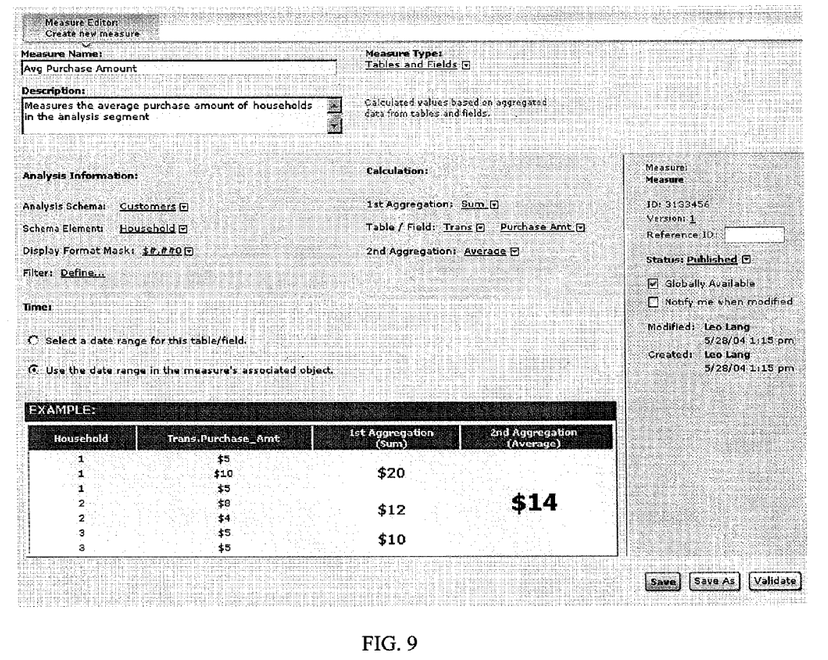
FIG. 9 is an example screen shot of a measure editor tool for defining a user-defined measure, according to an example embodiment.

FIG. 9 is an example screen shot of a measure editor tool for defining a user-defined measure, according to an example embodiment.

The GUI custom analysis tool may also include a variety of other features, such as a screen for defining and using or testing a user-defined measure, as is depicted in the measure editor of the FIG. 9. Measures can have types, such as attribute measures to calculate values based on attributes; schema count measures to count the number of schema elements in a particular segment; segment count measures to count the number of segment elements in context-sensitive situations; tables and fields measures to calculate values based on aggregated data from tables and fields; percentile profiling measures to aggregated data which can be used for grouping deciles or applied to deciles; etc.

Thus, the tools presented herein can also be used to create measures types in a user-defined manner and they can be dynamically tested or run to depict results in an interactive graphic illustration or table form along with the measure being defined. It is noted that measures on their own do not have results so the measure editor uses other tools presented herein to present test results associated with processing a particular user-defined measure.

It is now understood how analysis types can be created in a more user friendly manner to promote reuse with a streamlined and consistent interface via the tools presented herein and above. Users can also visually see the components of custom analysis modules and results associated with executing the modules on a same screen or display. Moreover, the results are interactive to supply more or less information or to be modified and submitted for further analysis. In some cases, portions of the results from the interactive graphic illustration can even be selected and saved to the data store as a new user-defined customer segment. Additionally, custom analysis modules are not dependent on pre-existing hierarchies they are defined using any many-to-many relationship from schemas, schema elements, segments, and segment elements. Further, measures can be user defined and viewed in similar manners as the analysis types.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable medium as instructions that are processed by a processing device to perform the method, comprising:

presenting a generic graphical user interface (GUI) analysis tool;

providing within the generic GUI analysis tool fields to receive one or more schema and segment relationships, an analysis type, a profile name, and one or more user-defined measures, the user-defined measures are sets of calculations performed against data produced from a customized analysis tool;

receiving selections or inputs for each of the fields, a selected analysis type causes dynamic changes in other ones of the fields provided in the GUI analysis tool to reflect what is used with that selected analysis type, and communicating the selections and inputs to a driver service that builds an instance of the customized analysis module that can be processed against a data store when a particular one of inputs that identifies the profile name is referenced, and wherein some fields are identified as mandatory and other fields are identified as optional, policy defines the fields identified as mandatory and the other fields identified as optional; and processing the customized analysis module against the data store; and simultaneously presenting results returned from the processing in an interactive graphic illustration with the generic GUI analysis tool, the interactive graphic illustration is a grid that a user interacts with in real-time to acquire additional details for the results.

2. The method of claim 1 further comprising, positioning the interactive graphic illustration relative to the generic GUI analysis tool within a display in one of the following locations of a screen shot of the display, a location that is situated vertically under or above the generic analysis tool within the screen shot, a location that is situated horizontally on a right side or a left side of the generic analysis tool within the screen shot, and a location defined by a user relative to a position of the generic analysis tool within the screen shot.

3. The method of claim 1 further comprising, permitting portions of the interactive graphic illustration to be selectable in order to present increased information associated with a selected portion of the interactive graphic illustration or to presented decreased information associated with the selected portion of the interactive graphic illustration, wherein the increase and decrease of information is relative to original information presented with the interactive graphic illustration.

4. The method of claim 1 further comprising, augmenting the interactive graphic illustration with metadata defining properties associated with and information on the interactive graphic illustration.

5. The method of claim 1, wherein providing within the GUI analysis tool fields to further include providing one or more additional fields representing a text description for the profile name, one or more temporal restrictions, schema name, schema element, date range, and a filter name.

6. The method of claim 1 further comprising, saving an association between the particular one of the inputs for the profile name and the customized analysis module for subsequent use, retrieval, and reference within the generic GUI analysis tool.

* * * * *